(12) United States Patent
Hanson (10) Patent No.: US 12,110,997 B1
(45) Date of Patent: Oct. 8, 2024

(54) HOSE CLAMP TAIL CLIP (71) Applicant: Douglas L. Hanson, Alma, NE (US)

(72) Inventor: Douglas L. Hanson, Alma, NE (US)

( * ) Notice: Subject to any disclaimer, the term of this patent is extended or adjusted under 35 U.S.C. 154(b) by 99 days.

(21) Appl. No.: 17/970,664

(22) Filed: Oct. 21, 2022

(51) Int. Cl.
*F16L 33/035* (2006.01)

(52) U.S. Cl.
CPC .................................. *F16L 33/035* (2013.01)

(58) Field of Classification Search
CPC ....... F16L 33/035; F16L 33/085; F16L 33/08; F16B 2/26; B65D 63/06; Y10T 24/1441; Y10T 24/1443; Y10T 24/49; Y10T 24/1431; Y10T 24/1429; Y10T 24/1427
See application file for complete search history.

(56) References Cited

U.S. PATENT DOCUMENTS

| | | | | |
|---|---|---|---|---|
| 1,218,337 A | * | 3/1917 | Taylor | B65D 63/08 |
| | | | | 217/93 |
| 1,241,301 A | * | 9/1917 | Taylor | B65D 63/08 |
| | | | | 24/23 B |
| 1,433,837 A | * | 10/1922 | Morton | A41F 19/005 |
| | | | | 24/703.1 |
| 5,647,614 A | | 7/1997 | Asakura | |
| 6,205,624 B1 | | 3/2001 | Mockridge | |
| 6,824,169 B2 | | 11/2004 | Coffman | |
| 7,328,488 B1 | | 2/2008 | Gallo | |
| 7,347,454 B2 | | 3/2008 | Martus | |
| 8,607,422 B2 | | 12/2013 | Mohan et al. | |
| 10,399,754 B2 | * | 9/2019 | Prevot | B65D 63/08 |
| 10,584,817 B2 | | 3/2020 | Bowater et al. | |
| 10,781,952 B2 | | 9/2020 | Krüger et al. | |
| 10,962,156 B2 | | 3/2021 | Leusner et al. | |
| 2015/0226245 A1 | * | 8/2015 | Frankel | A47C 7/22 |
| | | | | 24/482 |
| 2020/0003644 A1 | * | 1/2020 | Christensen | B65D 63/14 |

* cited by examiner

*Primary Examiner* — Robert Sandy
(74) *Attorney, Agent, or Firm* — Cramer Patent & Design PLLC; Aaron R. Cramer (57) ABSTRACT

The hose clamp tail clip may include a top plate, a left retention hook, and a right retention. The hose clamp tail clip is a clip that may be coupled to a hose clamp to retain a tail of the hose clamp against a band of the hose clamp such that the tail does not cause interference, cuts, or other issues. The top plate may press against the top of the tail and may push the tail down against the band. The left retention hook and the right retention hook may extend downwards along the lateral sides of the tail and may curl under the band when the hose clamp tail clip is installed such that the band and the tail are retained between the top plate and the distal ends of the left retention hook and the right retention hook.

12 Claims, 12 Drawing Sheets

HOSE CLAMP TAIL CLIP

RELATED APPLICATIONS

Non-applicable.

FIELD OF THE INVENTION

The presently disclosed subject matter is directed generally to a hose clamp tail clip.

BACKGROUND OF THE INVENTION

Modern internal combustion engines are a true engineering marvel. Their long-run time between major maintenance is in stark contrast to engines of even a few decades ago which required constant adjustment and maintenance to keep them operational. However, when repair is required, one is sure to run into the use of hose clamps. Such clamps are used on cooling systems, fuel systems, and other systems on almost any type of motor vehicle. They are also found on standalone engines such as generators, pumps, power equipment and the like. They are ideal for applying large amounts of force to hold hoses, tubing, and even mechanical parts together.

During the tightening process of such clamps, a "tail" of unwanted clamp material is exposed on one side of the tightening mechanism. This tail sticks out where it poses a safety hazard due to its ability to snag clothing or even lacerate skin. Even if one should not contact these tails, they are not aesthetically pleasing to look at, and detract from the overall appearance of an engine or repair job. Accordingly, there exists a need for a means by which the loose tails of hose clamps can be restrained to eliminate the problems as described above. The development of the hose clamp tail clips fulfills this need.

SUMMARY OF THE INVENTION

The present invention provides for a hose clamp tail clip that has, a top plate adapted to press against a top of a tail of a hose clamp, a left retention hook adapted to extend downwards along a plurality of lateral sides of the tail of the hose clamp, and a right retention hook adapted to extend downwards along the lateral sides of the tail of the hose clamp. The top plate is adapted to push the tail down against a band of the hose clamp.

The top plate may be a rigid plate that presses down against the tail when installed on the hose clamp. The top plate may prevent the tail from lifting away from the standing end of the band. The width of the top plate may be selected based upon the width of the band such that the left retention hook and the right retention hook may extend downwards past the tail and the band when installed on the hose clamp. The top plate may be equal to the width of the band. The top plate may be twenty-five present narrower than the width of the band. The top plate may be narrower than the band then the left retention hook and the right retention hook extend laterally to clear the band before bending downwards. The width of the top plate may be selected based upon the width of the band such that the left retention hook and the right retention hook extend downwards past the tail and the band when installed on the hose clamp. The top plate may be narrower than the band then the left retention hook and the right retention hook may extend laterally to clear the band before bending downwards. The top plate may be positioned against the tail and may be crimped to bend the left retention hook and the right retention hook towards the center of the tail such that a pair of distal ends of the left retention hook and the right retention hook may be moved into position beneath the band with the band and the tail retained between the top plate and the pair of distal ends of the left retention hook and a pair of distal ends of the right retention hook. The left retention hook may curl under the band such that the band and the tail are retained between the top plate and the pair of distal ends of the left retention hook and the right retention hook. The left retention hook and the right retention hook may be bent such that the pair of distal ends of the left retention hook and the right retention hook reside under the band. The band and the tail may be retained between the top plate and the pair of distal ends of the left retention hook and the right retention hook when installed on the hose clamp. The left retention hook and the right retention hook may initially be splayed in a lateral direction such that the spacing between the pair of distal ends of the left retention hook and the right retention hook may be larger than the width of the band. The right retention hook may curl under the band such that the band and the tail may be retained between the top plate and the pair of distal ends of the right retention hook and the right retention hook. The left retention hook may be coupled to a left lateral side of the top plate. The right retention hook may be coupled to a right lateral side of the top plate. The left retention hook and the right retention hook may be positioned at the longitudinal centers of the left lateral side and the right lateral side, respectively. The left retention hook and the right retention hook may be positioned along of the left lateral side and the right lateral side, respectively, and may more longitudinally offset from each other. The initial orientations of the left retention hook and the right retention hook may allow the top plate to be lowered onto the tail without interference from the left retention hook and the right retention hook.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 100 hose clamp tail clip
200 top plate
210 left retention hook
212 right retention hook
220 left stopper
222 right stopper
230 slot lock
280 first embodiment
282 second embodiment
284 third embodiment
900 hose clamp
902 tightening mechanism
904 screw head
906 band
908 slot
910 standing end
912 running end
920 tail
930 pair of pliers

DESCRIPTION OF THE INVENTION

The present invention is directed to a hose clamp tail clip (herein described as the "invention") 100. The invention 100 may comprise a top plate 200, a left retention hook 210, and a right retention hook 212. The invention 100 is a clip that may be coupled to a hose clamp 900 to retain a tail 920 of the hose clamp 900 against a band 906 of the hose clamp 900 such that the tail 920 does not cause interference, cuts, or other issues. The top plate 200 may press against the top of the tail 920 and may push the tail 920 down against the band 906. The left retention hook 210 and the right retention hook 212 may extend downwards along the lateral sides of the tail 920 and may curl under the band 906 when the invention 100 is installed such that the band 906 and the tail 920 are retained between the top plate 200 and the distal ends of the left retention hook 210 and the right retention hook 212.

As used throughout this document: A hose clamp 900 is a device that may encircle a hose and may apply radial inward pressure to the hose such that the hose clamp 900 retains the hose on a hose fitting. The hose clamp 900 may compress the hose to form a seal with between the hose and the hose fitting.

The hose clamp 900 may comprise a tightening mechanism 902 and a band 906. The band 906 may be a semi-rigid strip of metal that is coupled to the tightening mechanism 902 at one (1) end of the band 906. The end of the band 906 that is coupled to the tightening mechanism 902 may be referred to as a standing end 910 of the band 906. The end of the band 906 that is opposite the standing end 910 may be referred to as a running end 912 of the band 906.

The band 906 may comprise a plurality of slots 908 that may enable the tightening mechanism 902 to pull the running end 912 of the band 906 through the tightening mechanism 902.

The hose clamp 900 may be installed by sliding the hose onto the hose fitting, placing the tightening mechanism 902 against the hose, passing the band 906 around the hose, and drawing the running end 912 of the band 906 through the tightening mechanism 902 until the hose clamp 900 retains the hose on the hose fitting.

Alternatively, the running end 912 of the band 906 may be drawn through the tightening mechanism 902 to form the band 906 into a closed loop with a diameter that is larger than the outside diameter of the hose while the hose is off of the hose fitting. The band 906 may then be positioned around the hose and the hose may be placed onto the hose fitting. The tightening mechanism 902 may then be tightened to retain the hose on the hose fitting.

The running end 912 of the band 906 may be referred to as a tail 920 after the running end 912 passes through the tightening mechanism 902 and emerges from the side of the tightening mechanism 902 opposite where the running end 912 entered the tightening mechanism 902.

The tightening mechanism 902 may comprise a worm gear that may be turned by a screw head 904. Turning the screw head 904 in a first rotational direction may pull the running end 912 of the band 906 through the tightening mechanism 902 in a direction that tightens the hose clamp 900. Turning the screw head 904 in a second rotational direction may pull the running end 912 of the band 906 through the tightening mechanism 902 in a direction that loosens the hose clamp 900.

The top plate 200 may be a rigid plate that may press down against the tail 920 when the invention 100 is installed on the hose clamp 900. The top plate 200 may prevent the tail 920 from lifting away from the standing end 910 of the band 906. The left retention hook 210 may be coupled to the left lateral side of the top plate 200 and the right retention hook 212 may be coupled to the right lateral side of the top plate 200.

The left retention hook 210 and the right retention hook 212 may be bent such that the distal ends of the left retention hook 210 and the right retention hook 212 may reside under the band 906 with both the band 906 and the tail 920 retained between the top plate 200 and the distal ends of the left retention hook 210 and the right retention hook 212 when the invention 100 is installed on the hose clamp 900.

The width of the top plate 200 may be selected based upon the width of the band 906 such that the left retention hook 210 and the right retention hook 212 may extend downwards past the tail 920 and the band 906 when the invention 100 is installed on the hose clamp 900. As non-limiting examples, the top plate 200 may be the width of the band 906 or up to twenty-five present (25%) narrower. If the top plate 200 is narrower than the band 906 then the left retention hook 210 and the right retention hook 212 may extend laterally to clear the band 906 before bending downwards.

Figure 1:
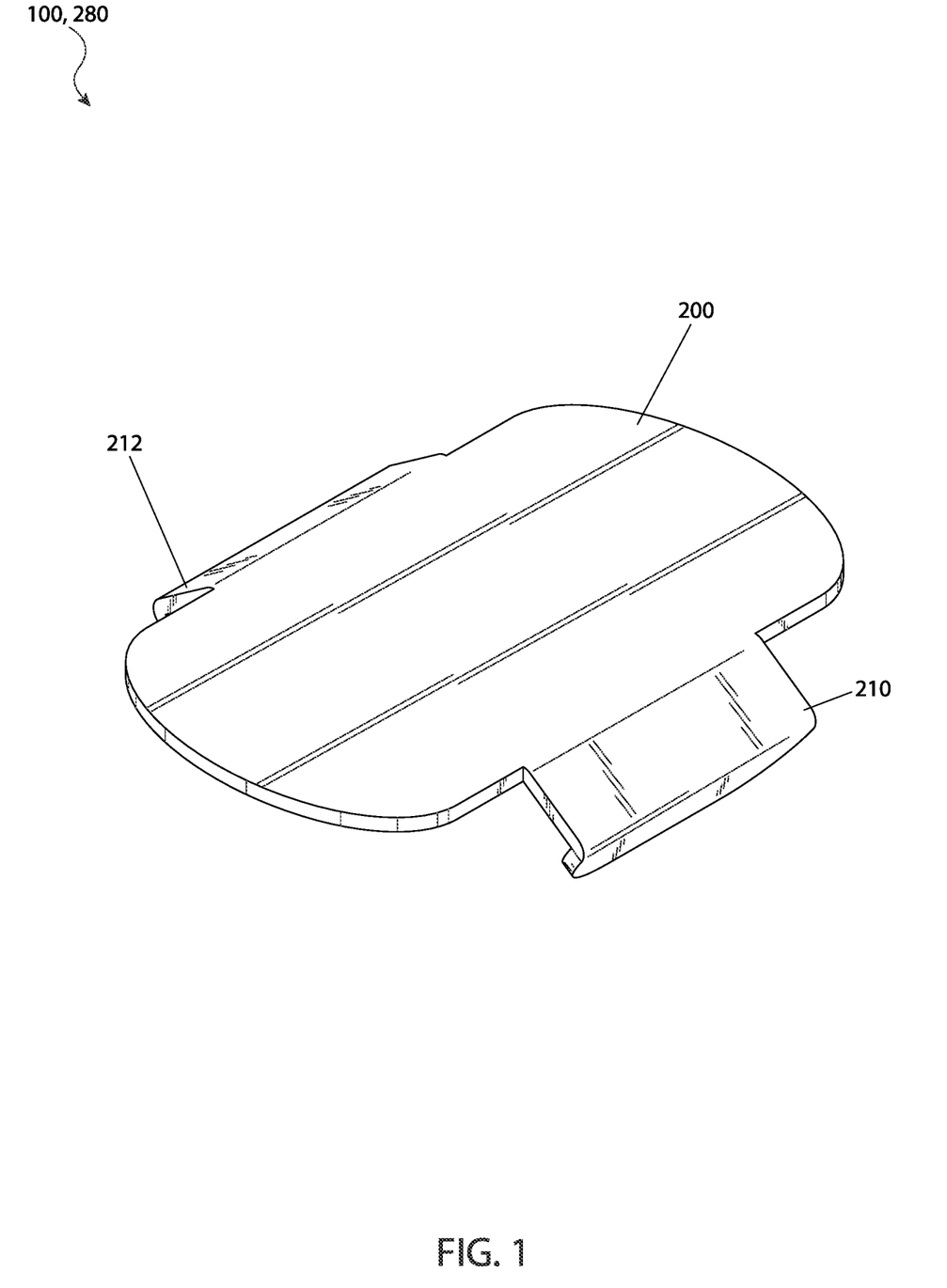
FIG. 1 is an isometric view of a hose clamp tail clip, according to a first embodiment of the present invention.
Figure 2:
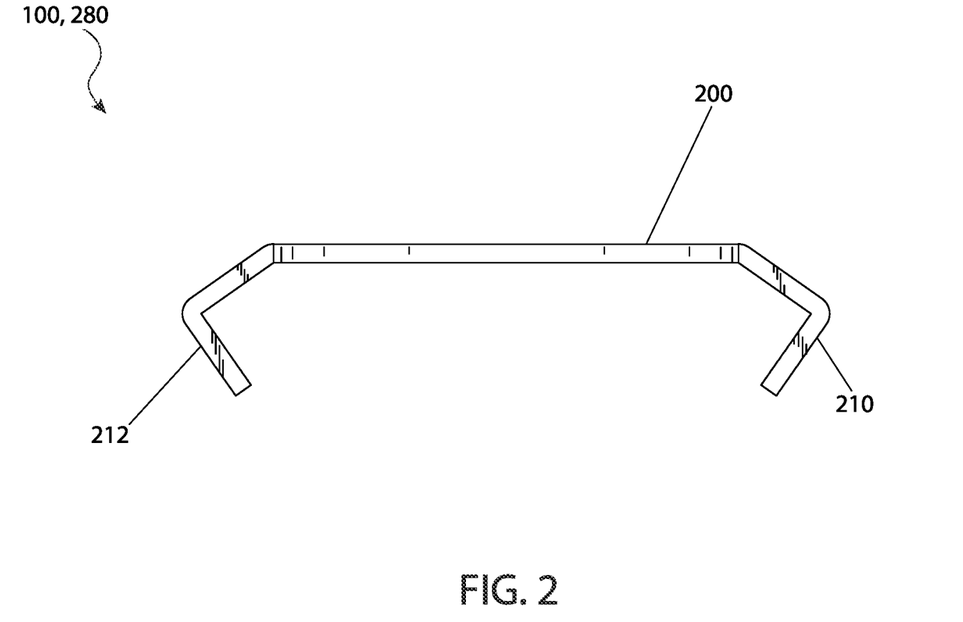
FIG. 2 is a front view of a hose clamp tail clip, according to a first embodiment of the present invention.
Figure 3:
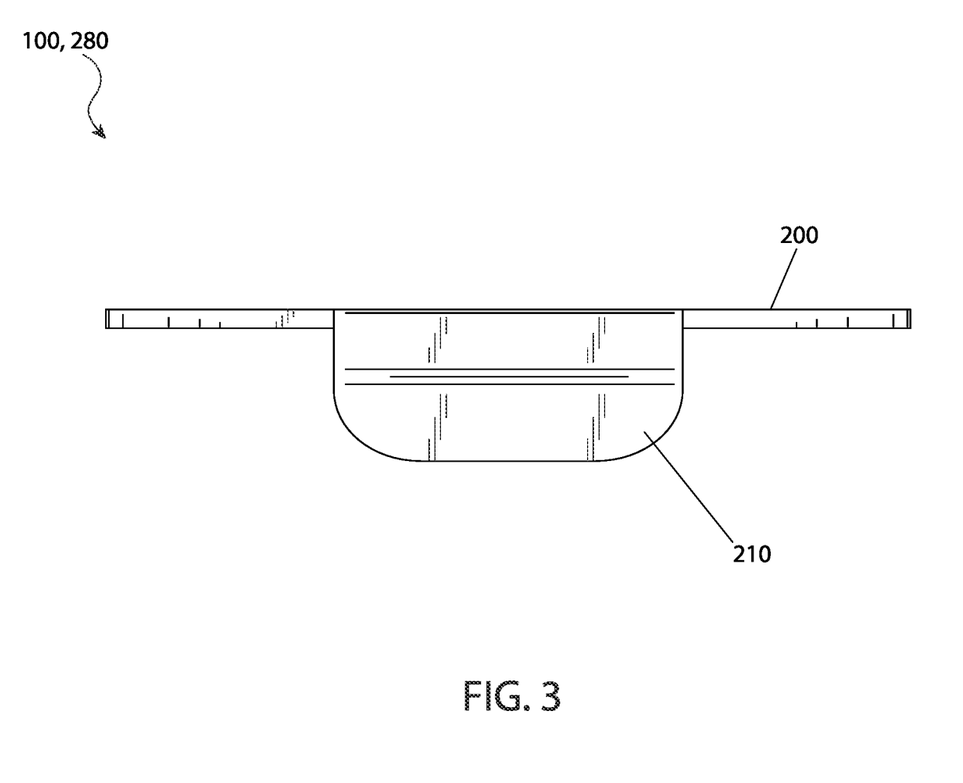
FIG. 3 is a left side view of a hose clamp tail clip, according to a first embodiment of the present invention.
Figure 4:
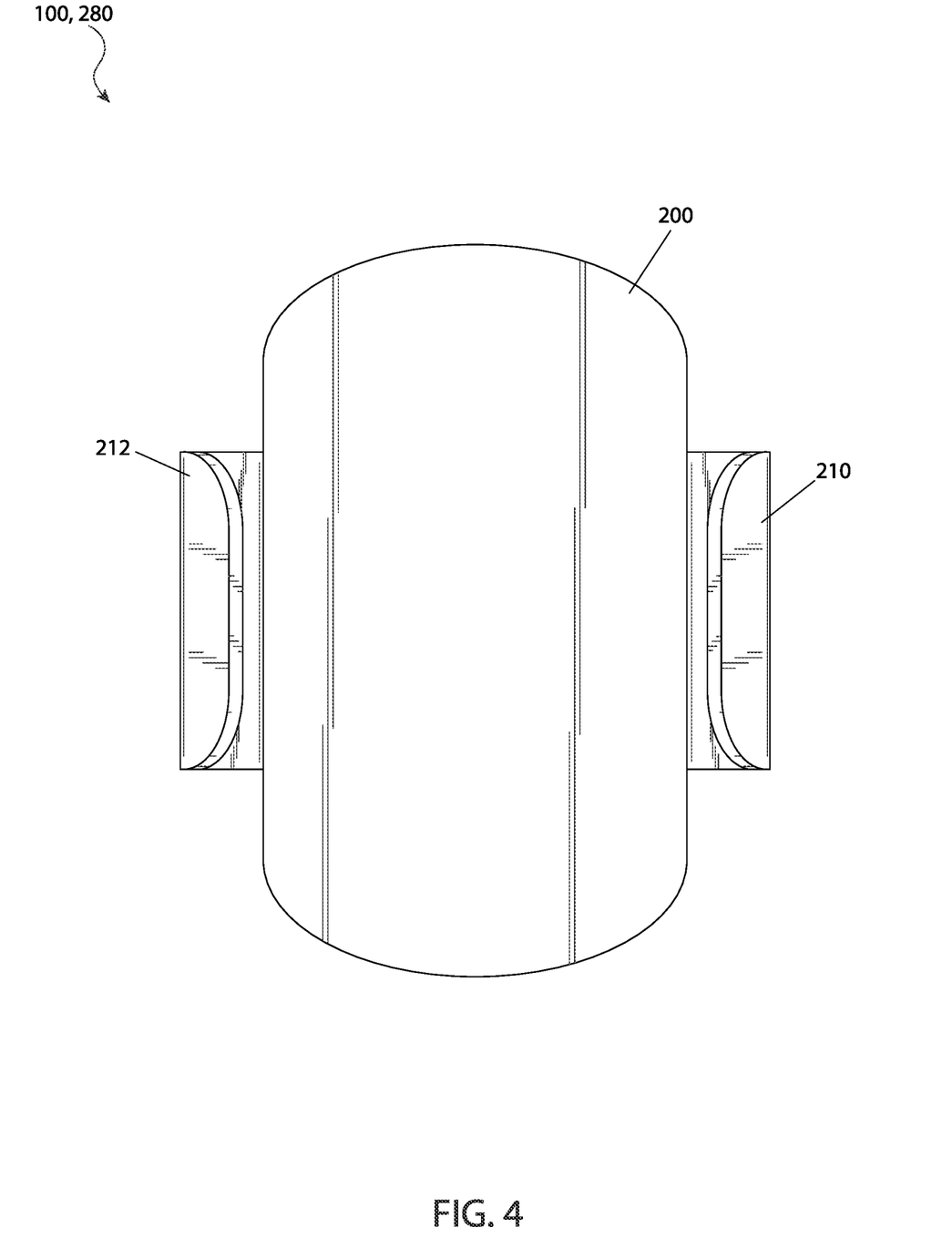
FIG. 4 is a bottom view of a hose clamp tail clip, according to a first embodiment of the present invention.
Figure 5:
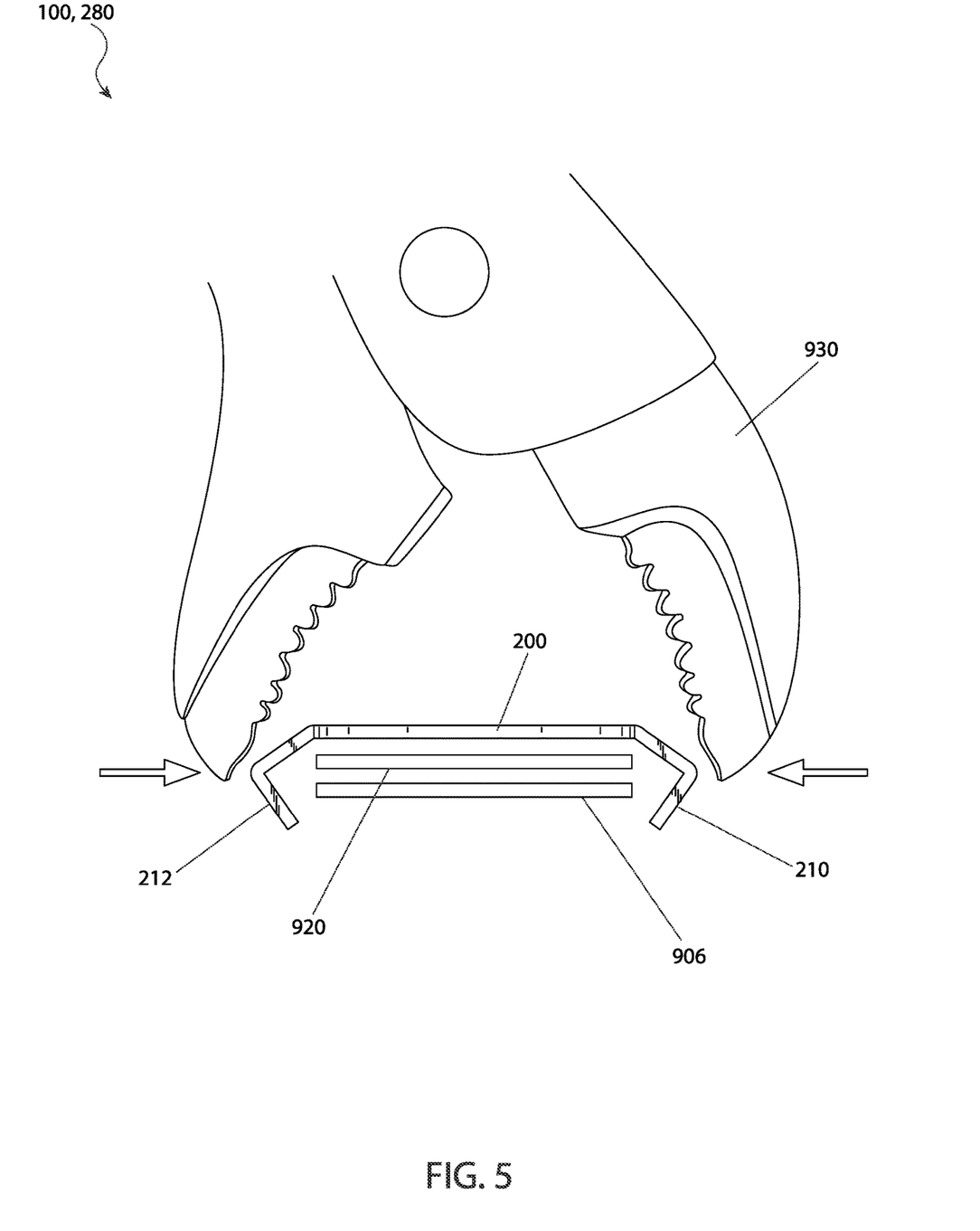
FIG. 5 is an in-use view of a hose clamp tail clip, according to a first embodiment of the present invention.
Figure 6:
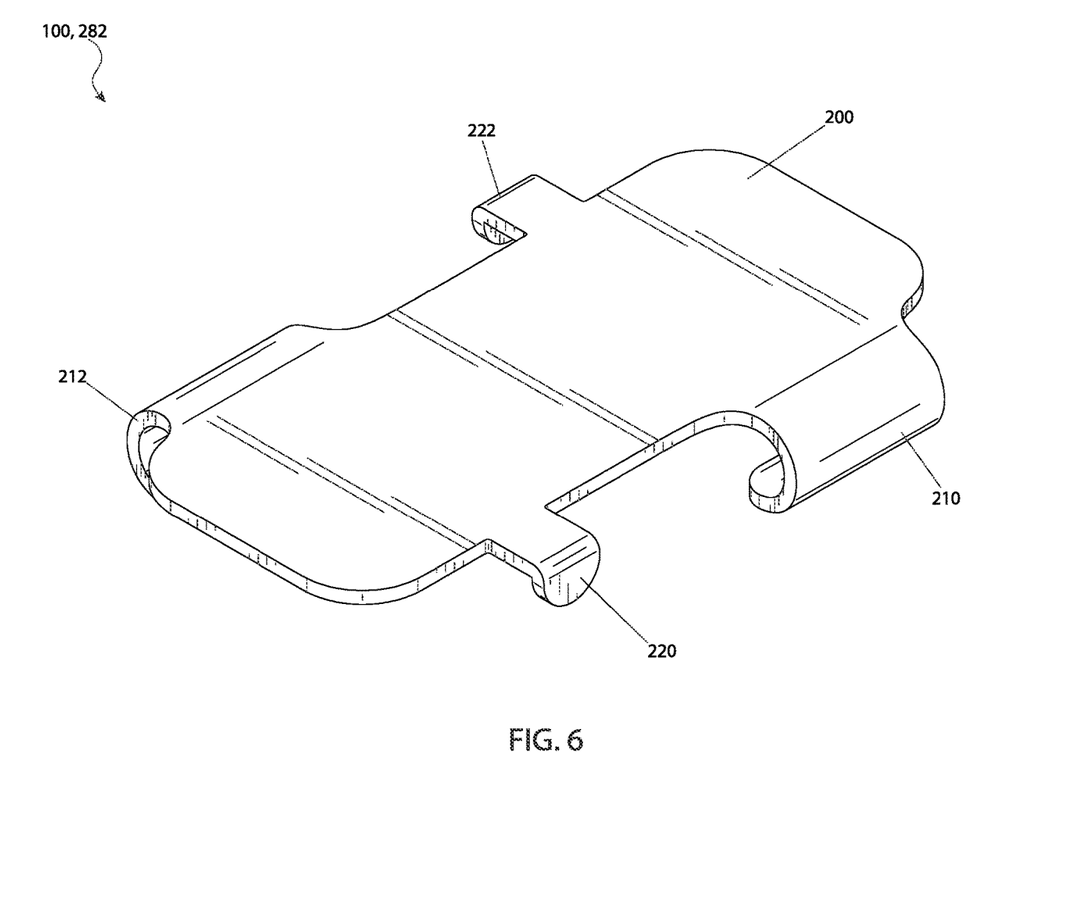
FIG. 6 is an isometric view of a hose clamp tail clip, according to a second embodiment of the present invention.
Figure 7:
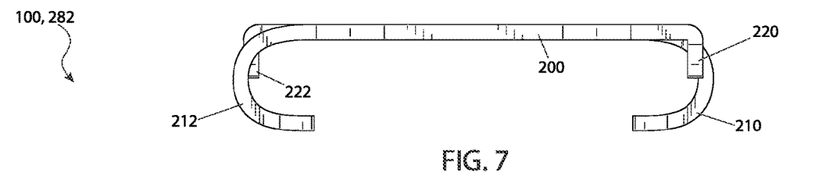
FIG. 7 is a front view of a hose clamp tail clip, according to a second embodiment of the present invention.
Figure 8:
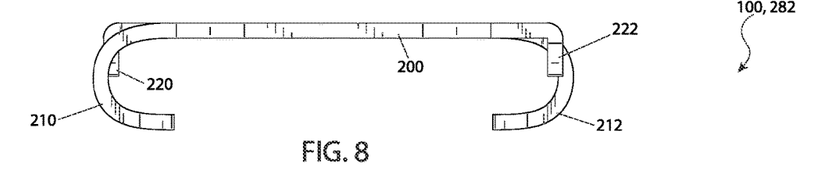
FIG. 8 is a rear view of a hose clamp tail clip, according to a second embodiment of the present invention.
Figure 9:
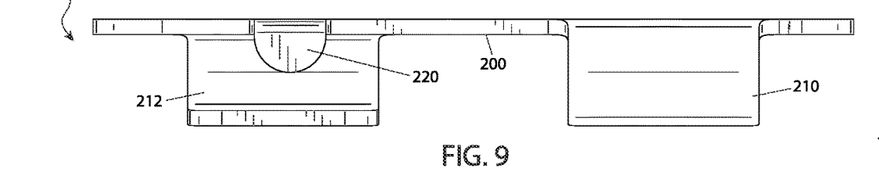
FIG. 9 is a left side view of a hose clamp tail clip, according to a second embodiment of the present invention.
Figure 10:
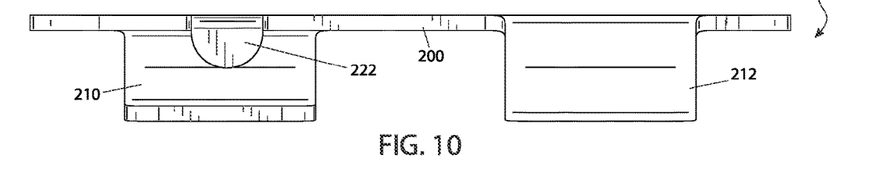
FIG. 10 is a right side view of a hose clamp tail clip, according to a second embodiment of the present invention.
Figure 11:
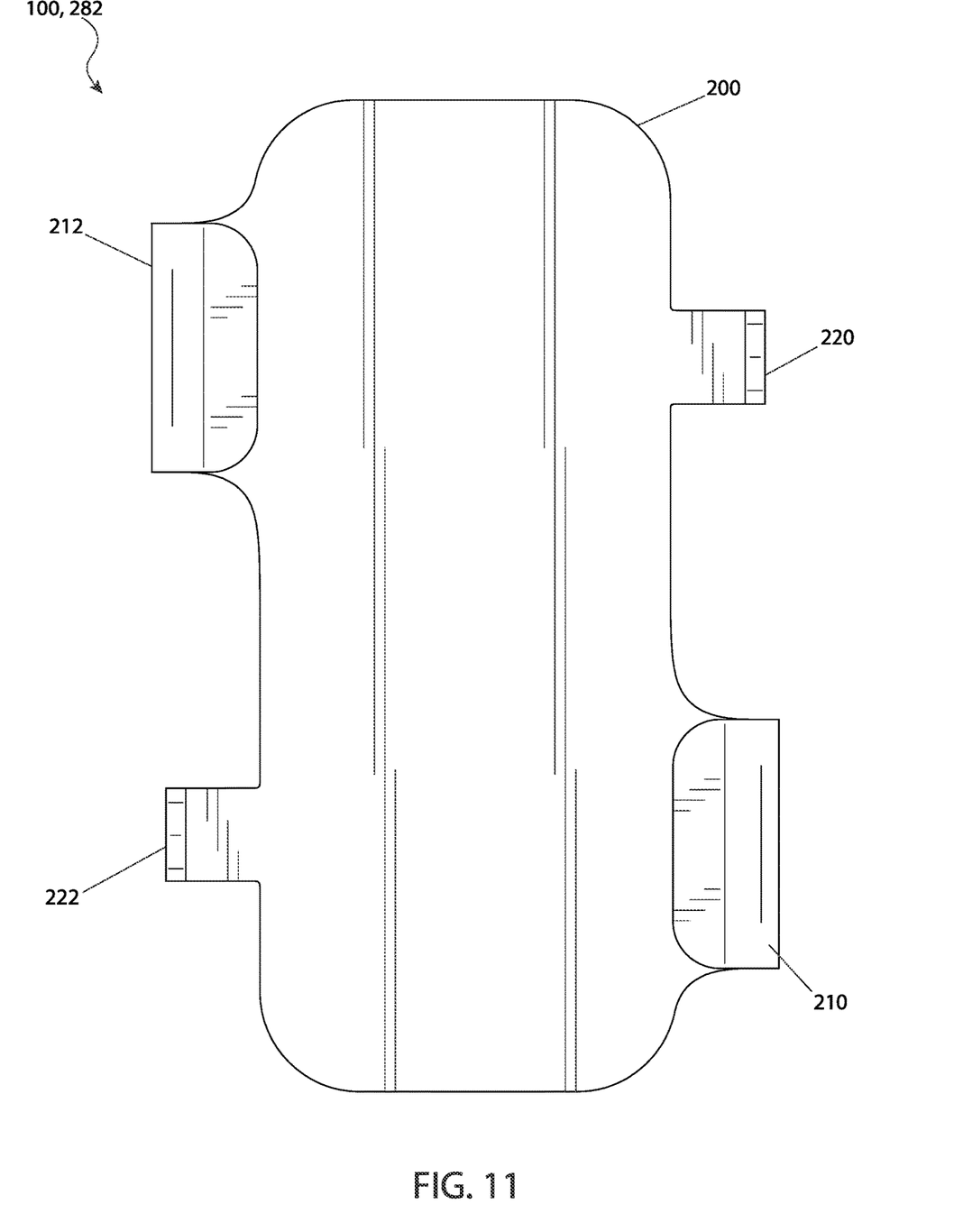
FIG. 11 is a bottom view of a hose clamp tail clip, according to a second embodiment of the present invention.
Figure 12:
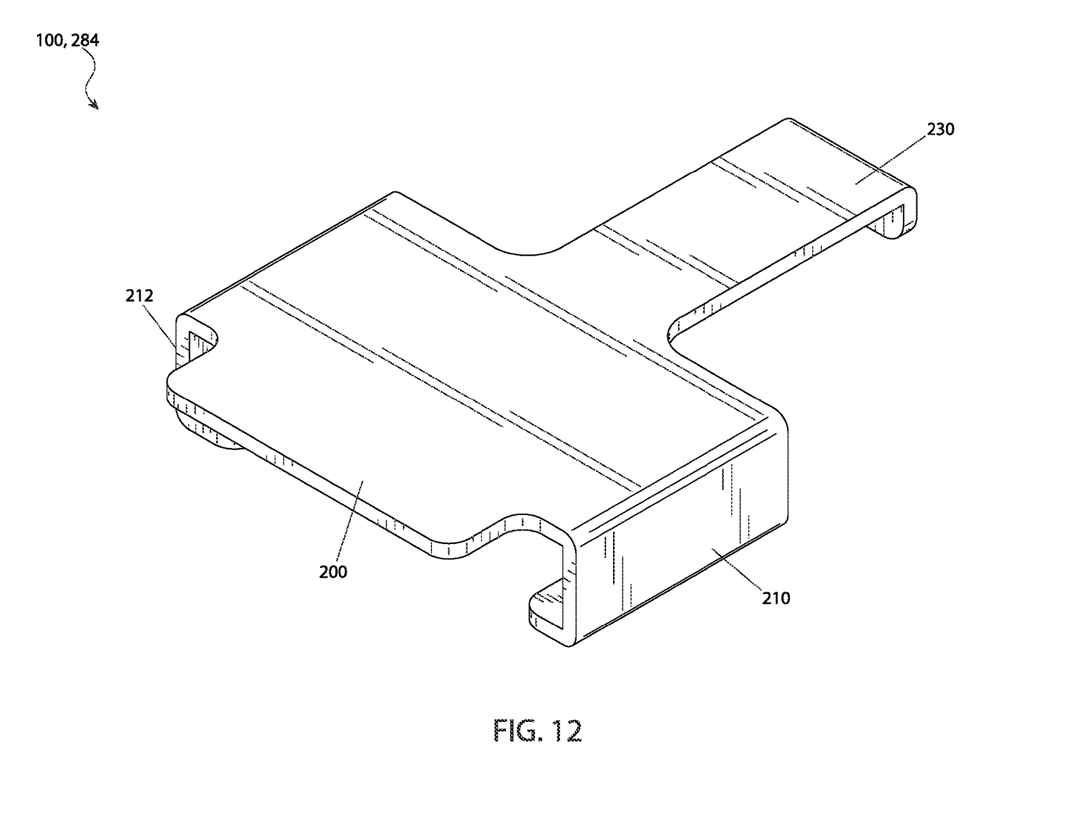
FIG. 12 is an isometric view of a hose clamp tail clip, according to a third embodiment of the present invention.
Figure 13:
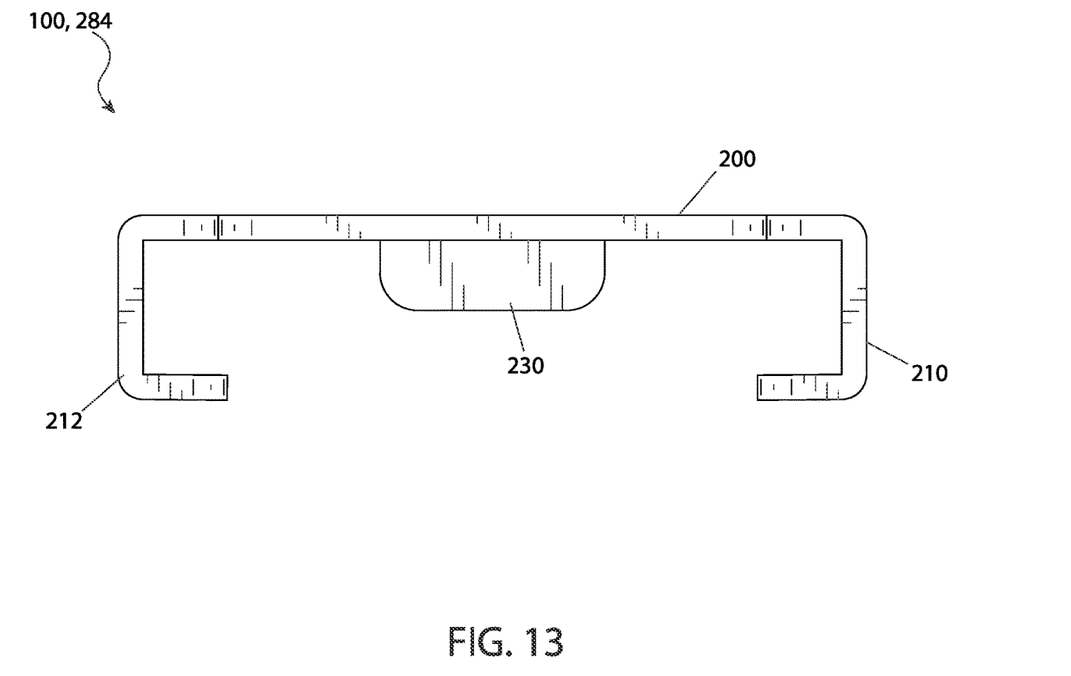
FIG. 13 is a front view of a hose clamp tail clip, according to a third embodiment of the present invention.
Figure 14:
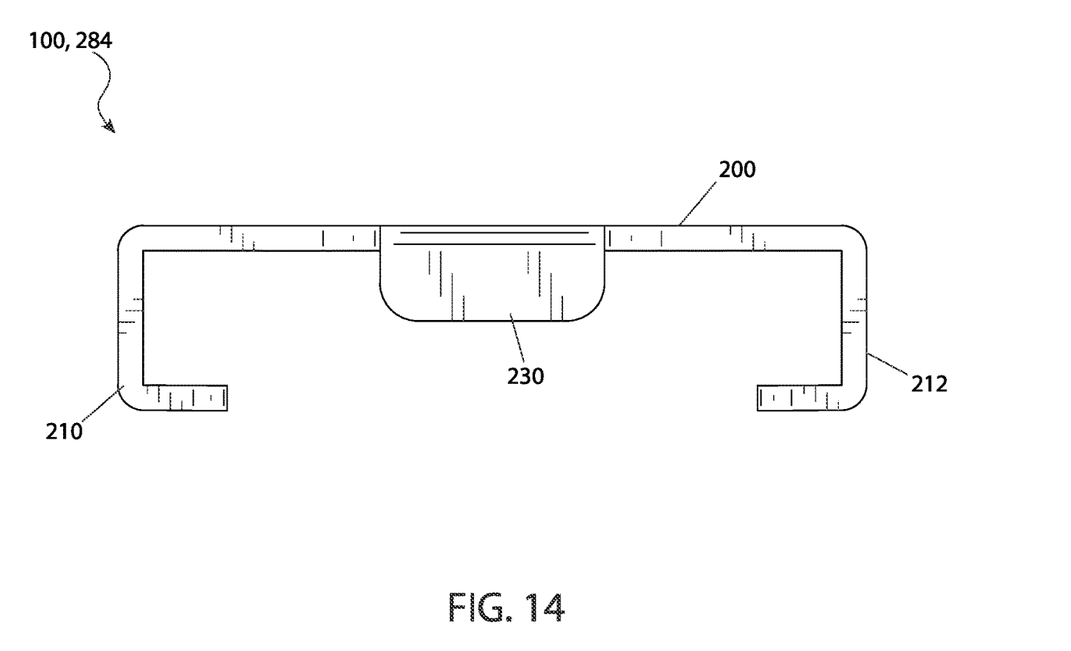
FIG. 14 is a rear view of a hose clamp tail clip, according to a third embodiment of the present invention.
Figure 15:
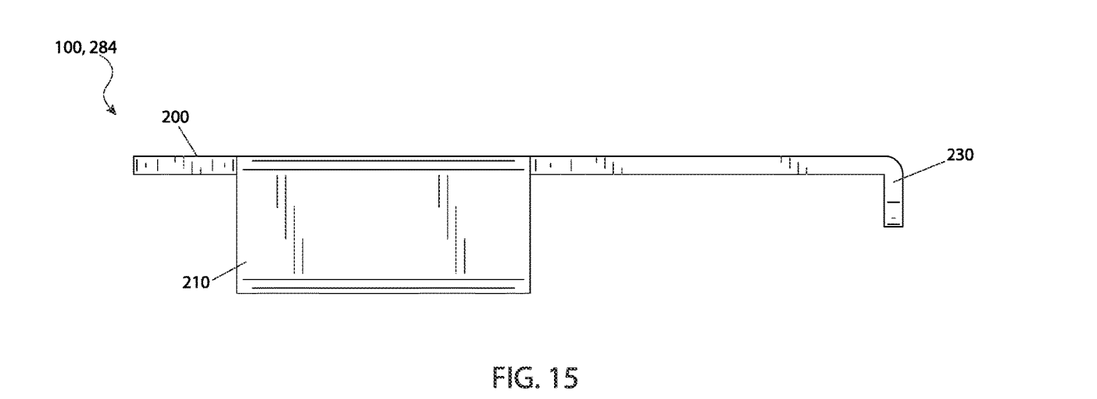
FIG. 15 is a left side view of a hose clamp tail clip, according to a third embodiment of the present invention.
Figure 16:
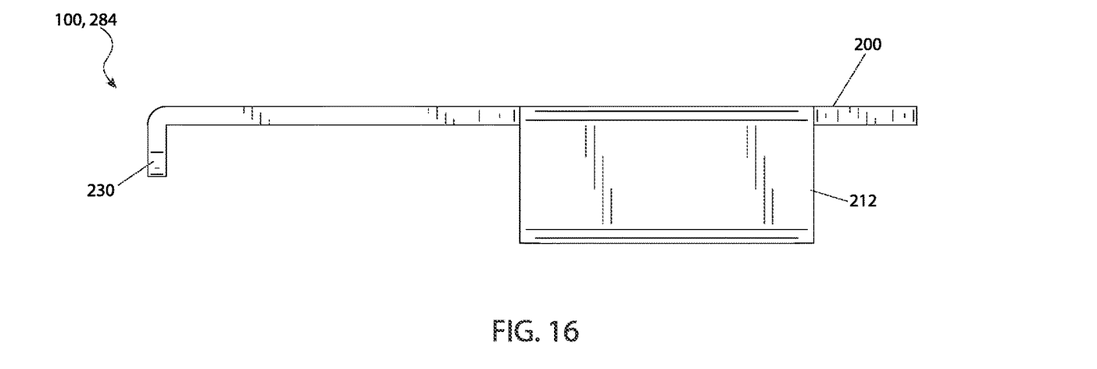
FIG. 16 is a right side view of a hose clamp tail clip, according to a third embodiment of the present invention.
Figure 17:
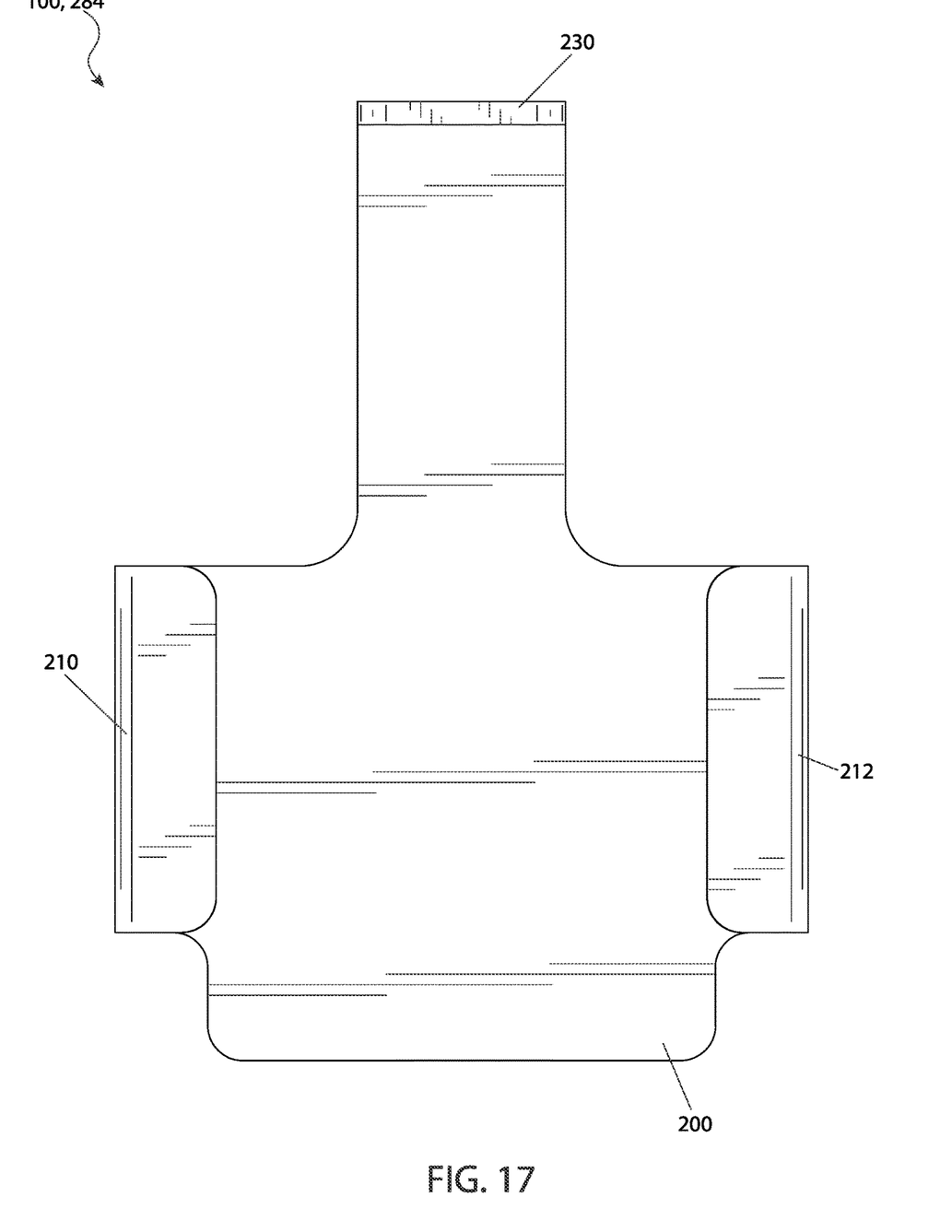
FIG. 17 is a bottom view of a hose clamp tail clip, according to a third embodiment of the present invention.
Figure 18A:
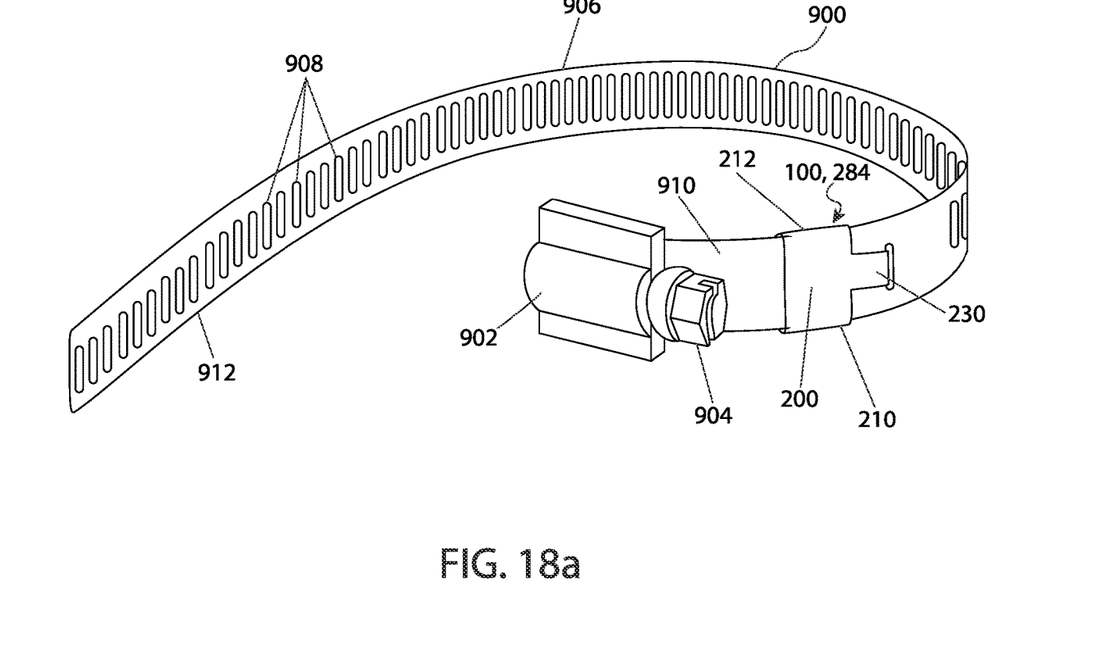
FIG. 18A is an in-use view of a hose clamp tail clip, according to a third embodiment of the present invention, illustrating the hose clamp in an open configuration.
Figure 18B:
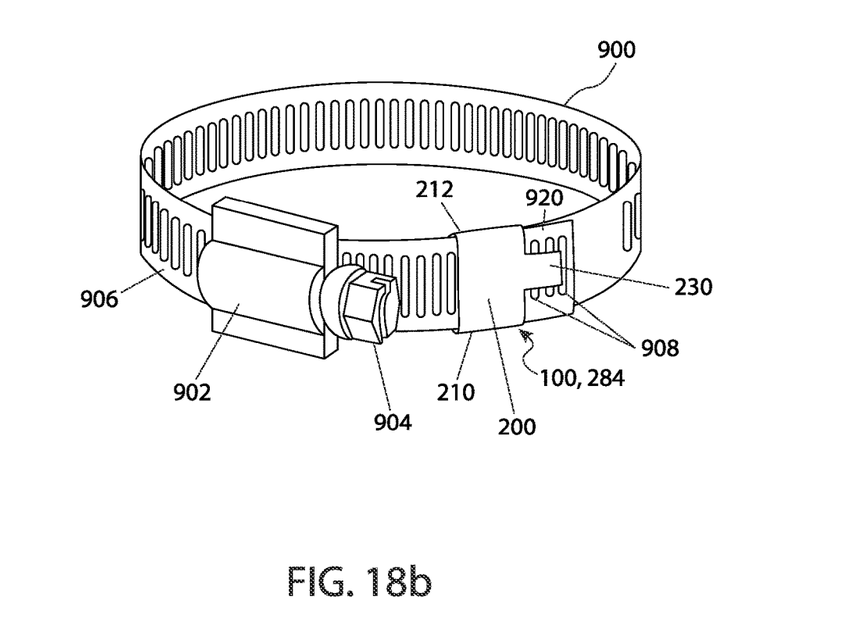
FIG. 18B is an in-use view of a hose clamp tail clip, according to an embodiment of the present invention, illustrating the hose clamp in a closed configuration.

Embodiments of the invention 100 may provide different mechanisms for installing the invention 100: In a first embodiment 280, the left retention hook 210 and the right retention hook 212 may be positioned at the longitudinal centers of the left lateral side and the right lateral side, respectively. Prior to installation, the left retention hook 210 and the right retention hook 212 may initially be splayed in a lateral direction such that the spacing between the distal ends of the left retention hook 210 and the right retention hook 212 may be larger than the width of the band 906. The initial orientations of the left retention hook 210 and the right retention hook 212 may allow the top plate 200 to be lowered onto the tail 920 without interference from the left retention hook 210 and the right retention hook 212. Once the top plate 200 is positioned against the tail 920, the invention 100 may be crimped to bend the left retention hook 210 and the right retention hook 212 towards the center of the tail 920 such that the distal ends of the left retention hook 210 and the right retention hook 212 are moved into position beneath the band 906 with the band 906 and the tail 920 retained between the top plate 200 and the distal ends of the left retention hook 210 and the right retention hook 212. As a non-limiting example, the invention 100 may be crimped using a tool such as a pair of pliers 930 as shown in FIG. 5. Once crimped, the invention 100 may be held on the hose clamp 900 by the left retention hook 210 and the right retention hook 212.

In a second embodiment 282, the left retention hook 210 and the right retention hook 212 may be positioned along of the left lateral side and the right lateral side, respectively, and may be longitudinally offset from each other. Specifically, the left retention hook 210 may be located on the half of the left lateral side that is closer to the tightening mechanism 902 and the right retention hook 212 may be located on the half of the right lateral side that is farther away from the tightening mechanism 902, or vice versa. The invention 100 may further comprise a left stopper 220 and a right stopper 222. The left stopper 220 may be an armature coupled to the left side of the top plate 200 opposite the right retention hook 212 and the right stopper 222 may be an armature coupled to the right side of the top plate 200 opposite the left retention hook 210. The left stopper 220 and the right stopper 222 may bend downwards towards the band 906 but may be shorter than the left retention hook 210 and the right retention hook 212. As a non-limiting example, the left stopper 220 and the right stopper 222 may extend downwards only half of the distance to the bottom of the band 906.

In the second embodiment 282, the spacing between the distal ends of the left retention hook 210 and the right retention hook 212 may be smaller than the width of the band 906 such that the left retention hook 210 and the right retention hook 212 may prevent the invention 100 from being removed from the hose clamp 900 once installation is complete. To install the second embodiment 282 of the invention 100, the invention 100 may be rotated with respect to a center axis that is normal to the top surface of the top plate 200 such that the left retention hook 210 and the right retention hook 212 clear the tail 920 and the band 906. The invention 100 may be lowered onto the hose clamp 900 while in this rotated orientation such that the left retention hook 210 and the right retention hook 212 drop below the band 906. The invention 100 may then be rotated in the opposite direction until the top plate 200 is aligned with the hose clamp 900 and the left stopper 220 and the right stopper 222 extend down along the sides of the hose clamp 900. Once installed, the band 906 and the tail 920 may be retained between the top plate 200 and the distal ends of the left retention hook 210 and the right retention hook 212. The left stopper 220 and the right stopper 222 may prevent rotation of the invention 100 that would allow the invention 100 to be lifted off of the hose clamp 900.

In a third embodiment 284, the left retention hook 210 and the right retention hook 212 may be positioned at the longitudinal centers of the left lateral side and the right lateral side, respectively. The spacing between the distal ends of the left retention hook 210 and the right retention hook 212 may be smaller than the width of the band 906 such that the left retention hook 210 and the right retention hook 212 may prevent the invention 100 from being removed from the hose clamp 900 once installation is complete. The invention 100 may further comprise a slot lock 230. The slot lock 230 may be an L-shaped armature that may extend longitudinally away from one longitudinal side of the top plate 200 and then may bend downward. Once the invention 100 is installed, the slot lock 230 may engage one (1) of the plurality of slots 908 of the tail 920 such that the slot lock 230 may prevent the invention 100 from sliding longitudinally along the tail 920.

The third embodiment 284 of the invention 100 may be installed by sliding the invention 100 onto the band 906 before the running end 912 of the band 906 is sent through the tightening mechanism 902, by wrapping the band 906 around the hose, by feeding the running end 912 of the band 906 through the tightening mechanism 902, by threading the tail 920 between the top plate 200 and the standing end 910 of the band 906, and by engaging the slot lock 230 into one (1) of the plurality of slots 908 of the tail 920. When the invention 100 is installed the band 906 and the tail 920 are retained between the top plate 200 and the distal ends of the left retention hook 210 and the right retention hook 212 and the slot lock 230 may prevent the invention 100 from sliding along the tail 920.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A hose clamp tail clip, comprising:
   a top plate adapted to press against a top of a tail of a hose clamp, the top plate is adapted to push the tail down against a band of the hose clamp;
   a left retention hook adapted to extend downwards along a plurality of lateral sides of the tail of the hose clamp; and
   a right retention hook adapted to extend downwards along the lateral sides of the tail of the hose clamp and,
   wherein the left retention hook curls under the band such that the band and the tail are retained between the top plate and the pair of distal ends of the left retention hook and the right retention hook;
   wherein the left retention hook and the right retention hook are bent such that the pair of distal ends of the left retention hook and the right retention hook reside under the band;

wherein the band and the tail are retained between the top plate and the pair of distal ends of the left retention hook and the right retention hook when installed on the hose clamp; and, wherein the left retention hook and the right retention hook are initially be splayed in a lateral direction such that the spacing between the pair of distal ends of the left retention hook and the right retention hook are larger than the width of the band.

2. The hose clamp tail clip, according to claim 1, wherein the top plate is a rigid plate that presses down against the tail when installed on the hose clamp.

3. The hose clamp tail clip, according to claim 1, wherein the top plate prevents the tail from lifting away from the standing end of the band.

4. The hose clamp tail clip, according to claim 1, wherein a width of the top plate is selected based upon a width of the band such that the left retention hook and the right retention hook extend downwards past the tail and the band when installed on the hose clamp.

5. The hose clamp tail clip, according to claim 1, wherein the width of the top plate is equal to the width of the band.

6. The hose clamp tail clip, according to claim 1, wherein the top plate is twenty-five present narrower than the width of the band.

7. The hose clamp tail clip, according to claim 1, wherein the top plate is narrower than the band that the left retention hook and the right retention hook extend laterally to clear the band before bending downwards.

8. The hose clamp tail clip, according to claim 1, wherein the left retention hook is coupled to a left lateral side of the top plate.

9. The hose clamp tail clip, according to claim 1, wherein the right retention hook is coupled to a right lateral side of the top plate.

10. The hose clamp tail clip, according to claim 9, wherein the left retention hook and the right retention hook are positioned at the longitudinal centers of the left lateral side and the right lateral side, respectively.

11. The hose clamp tail clip, according to claim 9, wherein the left retention hook and the right retention hook are positioned along of the left lateral side and the right lateral side, respectively, and more longitudinally offset from each other.

12. The hose clamp tail clip, according to claim 1, wherein an initial orientations of the left retention hook and the right retention hook allow the top plate to be lowered onto the tail without interference from the left retention hook and the right retention hook.

* * * * *